Patented Nov. 19, 1940

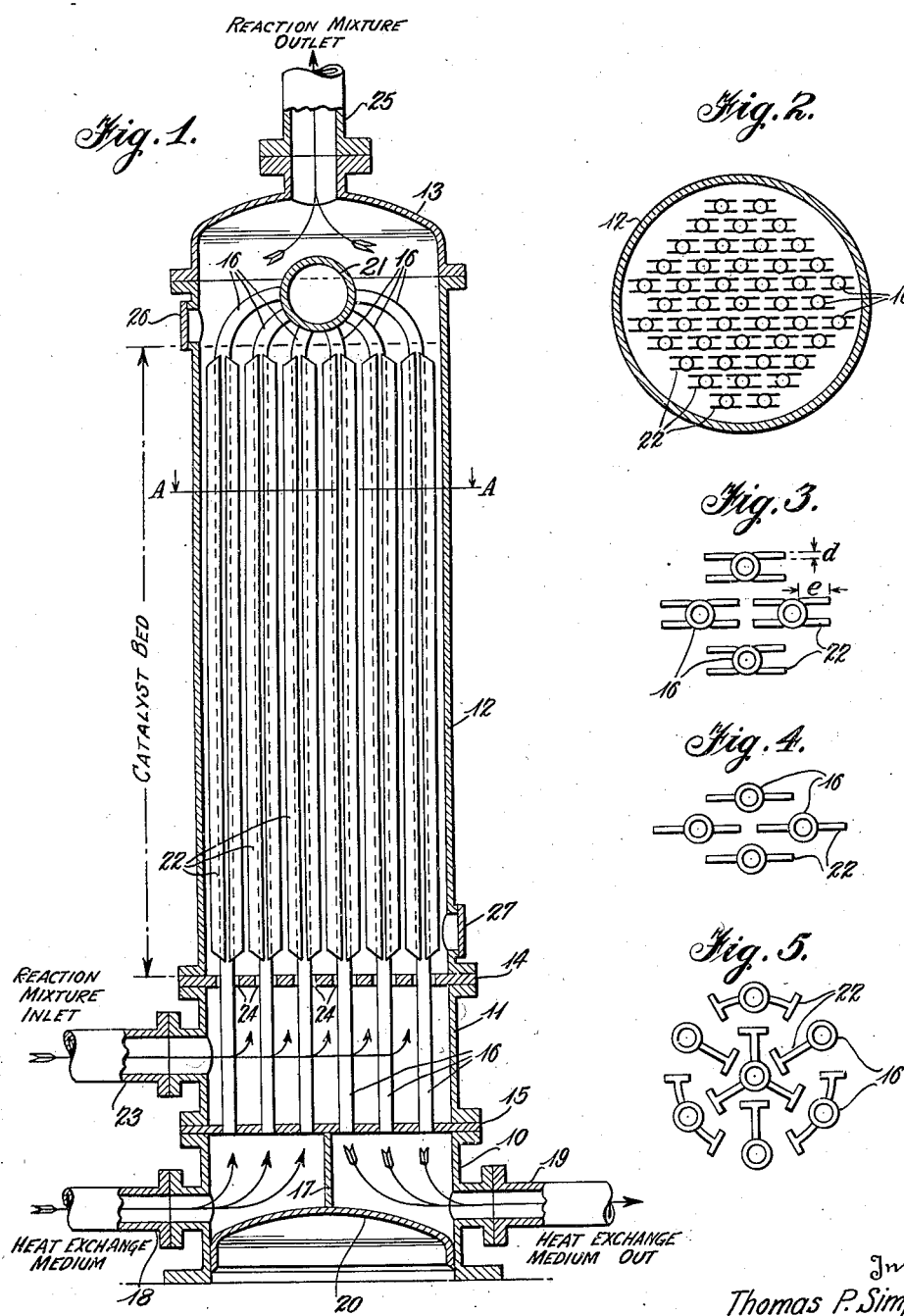

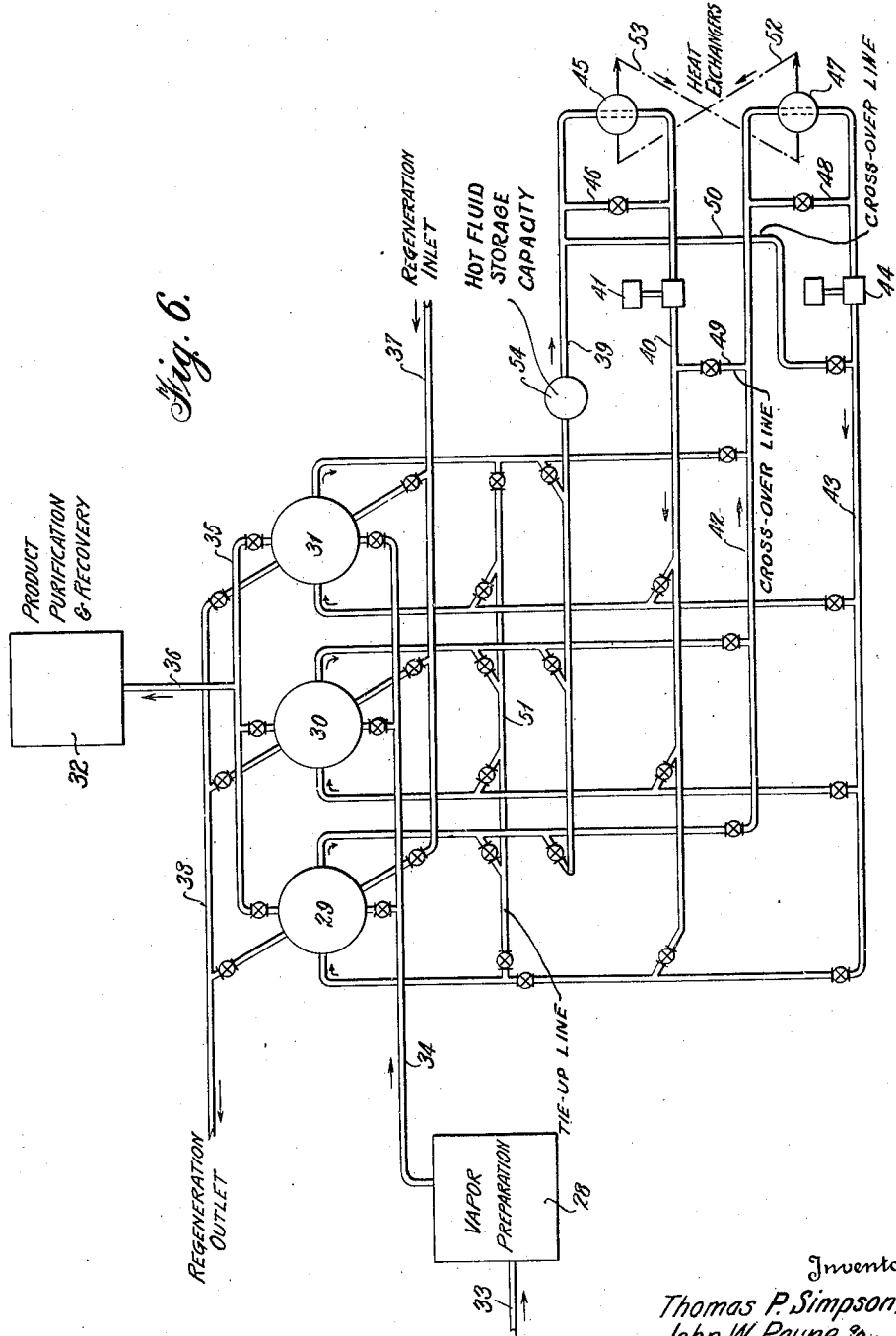

2,222,304

UNITED STATES PATENT OFFICE 2,222,304

METHOD AND APPARATUS FOR CATALYTIC REACTION

Thomas P. Simpson, John W. Payne, and John A. Crowley, Jr., Woodbury, N. J., assignors to Socony-Vacuum Oil Company, Incorporated, New York, N. Y., a corporation of New York Application September 4, 1937, Serial No. 162,542

9 Claims. (Cl. 196—10)

This invention is concerned with processes for carrying out reactions of substances in the presence of contact masses, followed by regeneration in situ of the contact mass. The temperature favorable to such reactions varies greatly with the nature of substance reacted and the type of reaction sought. It may be only slightly above atmospheric temperature for some substances and purposes, and it may be quite high, say 1,000° F. or more, for other substances and purposes. In the case of many organic reactions the catalyst or contact mass becomes charged with carbon, and is regenerated by burning. In this case, the regeneration must be conducted at temperatures above the kindling temperature of the deposits. In other cases, tarry or oily deposits may require steaming out for regeneration. If the deposit be of a sulphur nature it may be burned. In all of these cases, the optimum temperature for reaction and the optimum temperature for regeneration are each controlled by an entirely separate set of variables, and only in fortuitous circumstances do these variables require the same optimum temperature for each operation so that the catalyst may pass from reaction to regeneration without need for intervening temperature adjustment.

This invention is directed to methods and apparatus for conducting reactions in the presence of contact masses, followed by regeneration of contact mass, wherein temperature adjustment of the contact mass is necessary between reaction and regeneration. Polymerization of hydrocarbon gases to gasoline is a typical operation set forth herein, and the disclosure is hereinafter restricted thereto as an exemplary operation, without, however, being limited thereto except in so far as limitations are expressed in the claims. By the present invention the adjustment of the contact mass from the temperature of reaction to the temperature of regeneration, or vice versa is obtained in a novel and efficient manner. Our co-pending application Serial No. 162,069 now U. S. Patent 2,185,929, filed September 1, 1937, is directed to catalytic processes in general and may be carried out in an apparatus such as disclosed and claimed in our co-pending application Serial No. 162,068 now U. S. Patent 2,185,928 filed September 1, 1937. Our co-pending application Serial No. 162,070 now U. S. Patent 2,185,930, filed September 1, 1937, was devised to afford a method particularly adapted for carrying out processes of catalytic conversion of hydrocarbon oils and may be carried out in an apparatus such as, for instance, is disclosed in our co-pending case Serial No. 162,071 now U. S. Patent 2,185,931, filed September 1, 1937. Our co-pending applications, Serial Nos. 162,540 now U. S. Patent 2,209,040 and 162,541, filed September 4, 1937, are likewise directed to processes and apparatus for catalytic conversion of the same general type as that of Serial Nos 162,068 now U. S. Patent 2,185,928 and 162,069 now U. S. Patent 2,185,929. However, among other features these two former cases are directed to novel features of reversal of fluid flow and continuous flow of catalytic material, respectively.

Light or gaseous hydrocarbons, generally unsaturated in nature, boiling below the boiling range of gasoline, may be converted into materials of gasoline boiling range of high antiknock quality. A convenient method of effecting such polymerization is by passing the hydrocarbons through a contact mass of granular particles which themselves exert a catalytic effect upon the reaction or which are impregnated with or act as a support for some catalytic material. This invention has to do with such processes.

In our copending application, Serial No. 162,069, now U. S. Patent 2,185,929 filed September 1, 1937 we disclose in general terms a novel method of catalytic conversion of hydrocarbon materials, based upon the principle of carrying out the conversions by passing the hydrocarbons through beds of catalytic material of relatively great length in proportion to transverse dimension, while controlling the reaction intensity and distribution by positively circulating a temperature-controlled heat exchange medium in heat exchange relationship with the material in the contact beds, afterward regenerating the catalyst in situ by passing an oxidizing medium through said beds while maintaining circulation of the heat transfer medium at a controlled temperature appropriate to the regeneration reaction. The present invention is specifically directed to adaptations of that process and its apparatus to give a highly useful method and apparatus for catalytic polymerization.

It has been found that catalytic polymerization of hydrocarbon gases to gasoline is most productive and satisfactory when the conversion process is carried out at temperatures of the order of 250° to 350° F. This temperature is considerably below the ignition temperatures required (about 600–800° F.) for regeneration of the catalyst by oxidation in situ. When operations of this type are conducted, in order to bring about satisfactory regeneration, it is necessary to bring the spent catalyst mass to regeneration temperature and to cool the regenerated catalyst mass to reaction temperature, as well as to separately control the temperatures of reaction and regeneration.

It is an object of this invention to provide a method of operation and an apparatus wherein it may be conducted, capable of independent control of the reaction and regeneration temperature, and capable of rapid, convenient, and economical changeover from reaction to regeneration and converse.

We have found that these objects may be conveniently attained by proper control of the heat transfer medium in a variation of our general method of operation, and have found that by proper procedure, temperature changes of the catalyst mass at the rate of 50–100° F. per minute may be obtained readily.

The broad aspects of our conversion process are discussed generally in our copending application, Serial No. 162,069, but in order that they may be readily understood, a drawing of a typical reaction case is shown as Figure 1 of the drawings of this specification, and Figures 2, 3, 4, and 5 show internal details thereof. Figure 6 shows an operating set-up of apparatus particularly appropriate for the practice of this invention.

Figure 1 shows in slightly diagrammatic form a catalyst chamber embodying the essential features necessary. This catalyst chamber consists of a shell composed of parts 10, 11, 12, and 13. Of these, 12 constitutes the jacket for the catalyst space itself, and 13 forms a closure for one end thereof. Shell 11 is joined to shell 12 with an intervening partition sheet 14 held therebetween. Shell 10, with the several parts hereinafter described, constitutes distributing and recollection means for a heat exchanger element, being fitted with tube sheet 15, which supports tubes 16, intermediate baffle plate 17, heat exchange medium inlet 18, heat exchange medium outlet 19, and end plate 20. Tubes 16 are led into return manifold 21 at their upper end, and are preferably furnished with fins 22. Shell 11 is fitted with an inlet 23 whereby reaction mixture may be led into the interior of shell 11, to pass therefrom into the catalyst space in shell 12 by properly distributed orifices in catalyst support plate 14, which orifices may conveniently be formed, as shown, by enlarging the holes in plate 14, through which pass tubes 16, to form annular orifices 24. The reaction mixture passes through orifices and upward through the catalyst maintained in shell 12, to be collected within head 13 and removed through passage 25. Shell 12 is fitted with sealed openings at 26 and 27, through which catalyst may be introduced and removed when change is necessary. The design and arrangements of the tubes 16 constituting a heat exchanger element is such that these tubes also serve to break the catalyst bed maintained in shell 12 into a larger number of longitudinal passages, whose greatest length is parallel to the direction of reaction mixture flow. To do this, advantage may be taken of fins upon tubes 16. Thus these fins 22 serve two purposes. First, they serve to define the passages above noted, and, of greater importance, they augment the ratio between external and internal surface of the heat exchanger tubes. To accomplish division of the whole catalyst mass into suitable longitudinal passages, each comprising a unit mass or unit path, the tubes and fins should be so arranged as to permit the least resistance to longitudinal flow, and, at the same time, to furnish a maximum resistance to lateral flow, although it is not necessary that each unit mass be substantially isolated from contact with other catalyst. The arrangement should also be such as to give a substantially constant cross-sectional area of catalyst throughout the length of the unit paths and catalyst case, which of itself promotes longitudinal flow under uniform conditions. Figure 2 shows a section taken at A—A in Figure 1, and sets forth a convenient and economical arrangement of tubes and fins to accomplish these purposes, which is shown in more detail in Figure 3. Other arrangements of finned tubes are shown in Figures 4 and 5. In these Figures 3, 4, 5, the set-up is designed for the circulation of a heat exchange medium inside the tubes, the catalyst being outside. The functions of these designs may also be attained by use of a large number of closely spaced small tubes, although this method is not preferred.

Alternative forms of reaction case construction in which this process may be practiced are shown in our copending application Serial No. 162,068 now U. S. Patent 2,185,928, filed September 1, 1937, and the principles upon which their design is based are discussed fully therein. The principles of design, as therein set forth, define the relationship between the hydraulic radius of the catalyst-containing reaction paths, the mass velocity of the critical reactant, and the mass velocity of the heat transfer medium. The design is controlled by the ratio of heat liberated or absorbed in the catalyst to heat transferred by the medium. If the heat load per unit time is greater for the regeneration, as in many cases, the regeneration medium will be the critical reactant for design purposes. Under proper conditions, the heat liberation (or demand) may be made substantially uniform per unit volume of catalyst. Heat transfer rate also may be made substantially uniform per unit area of heat transfer surface. The proper proportion of catalyst volume to heat transfer area is then shown by $$\frac{\text{Heat liberated per unit time per unit volume}}{\text{Heat transferred per unit time per unit area}} = 1/HR$$

where HR is a quantity of the nature of a hydraulic radius, having the dimension of length, and has a broad range of from 1/8" to 2" for possible operation and a preferred value of from 1/8" to 2/3". Also, for reasons of heat transfer within the contact mass, at least one transverse dimension thereof should not be substantially in excess of 2". The rate of heat liberation or demand is a function of the mass velocity of the critical reactant within the catalyst in weight per unit time per unit volume of catalyst. For example, in a regeneration operation burning carbon from a mass of the nature of clay, it would be that rate at which, while not exceeding a temperature of about 1,000° F., under conditions of operation, would remove carbon at rates of from about 1% by weight of catalyst per hour to about 10% per hour for a broad range of operation, and from about 3% to about 6% for preferred operation. The mass velocity of heat transfer medium depends upon the nature of the medium. It is best defined as that mass velocity of heat exchange medium which will extract the required amount of heat while undergoing a temperature rise of not greater than about 50° F., and preferably of from 2° to 10° F.

In a catalyst case of the above design, reaction and regeneration are carried out in the same manner, with steam purging between, the purging medium and the regeneration medium following the same paths as the reaction medium. Particular features of the process are the ability to maintain high reaction rates, rapid and uniform purging, and rapid and uniform regeneration without catalyst deterioration, the sum of regeneration time and two purgings usually being less than the time on stream in reaction.

Turning to Figure 6, showing an operating set-up for the practice of this invention, there is shown a means for preparation of reaction vapors 28, then catalyst chambers 29, 30, 31, and product purification and recovery equipment 32. Vapor preparation means 28 may be any of the usual types of heaters common in the art, such as a pipe still, or may even be an exchange heater, since the required temperature is low. Product purification and recovery equipment 32 consists of fractionators, separators, and the like of the kind commonly in use for treatment of the products of a cracking reaction. Catalyst cases 29, 30, 31, are of the nature described in connection with Figure 1. Charge material is fed to the system by pipe 33, prepared in means 28, and passed at reaction temperature, to the catalyst chambers by pipe 34, which is so manifolded that charge may be delivered to any chamber. Products are gathered from the chambers by manifold 35 and pass by pipe 36 to means 32. Regeneration medium may be selectively supplied to any catalyst chamber by pipe 37 and regeneration products from any chamber may be disposed of by pipe 38. Two separate circuits for heat transfer medium are supplied, one consisting of pipes 39 and 40, powered by pump 41, and the second of pipes 42 and 43, powered by pump 44. Both heat transfer circuits are so manifolded that either may serve any catalyst chamber, in a manner quite well known in the art and readily understood from the drawings. The first circuit contains a heat exchanger 45 and by-pass 46 for use in control of the temperature of the medium in this circuit. The second circuit is similarly equipped with heat exchanger 47 and by-pass 48. Cross-overs 49 and 50 are provided so that heat transfer material may be passed in controlled amounts from the discharge side of either circuit to the suction side of the other. Tie-line pipe 51 is placed in the manifold for a purpose later explained.

Two methods of operating such a system may be used. Both contemplate the use of separate circuits containing heat transfer medium held at widely different controlled temperature levels. In one method, the two circuits are essentially isolated, in the second they are serially connected.

In the first method of operation, assuming chamber 29 to be on reaction, low temperature medium may be circulated therein by either circuit, say for example the one comprising pipes 42 and 43 and pump 44, and heat demands therein may be adjusted by use of heat exchanger 47. Assuming chamber 31 to be on regeneration, high temperature medium may be circulated therein by the circuit comprising pipes 39 and 40 and pump 41, temperature of this medium being controlled by heat exchanger 45. Chamber 30, if it be changing from reaction to regeneration, may be heated by using high temperature medium from pipe 40, returned to pipe 39, or if it be changing from regeneration to reaction may be cooled by low temperature medium from pipe 43, returned to pipe 42.

In the second method of operation with 29 on reaction, and 31 on regeneration, if 30 be changing from reaction to regeneration, it may be heated by passing high temperature medium from pump 41 and pipe 40 into chamber 31, then through tie-line pipe 51 into and through chamber 30, then into pipe 42, cooled in exchanger 47, through pump 44 and pipe 43 as low temperature medium into and through chamber 29, out into pipe 39, heated in exchanger 45 and returned to 41. If 30 be changing from regeneration to reaction, low temperature medium from pump 44 may pass by line 43 into and through chamber 29, into tie-line pipe 51, into and through chamber 30, then into pipe 39, heated in exchanger 45, circulated as high temperature medium by pump 41 through pipe 40, into chamber 31, out into pipe 42, cooled in 47 and returned to pump 44. It is well in any case to have exchangers 47 and 45 connected as shown by dotted lines 52 and 53, so that heat extracted in one may be used in the other, although for purposes of control it is not well to combine these exchangers. If desired, independent control of the rate of change of temperature in the chamber 30 may be had by admitting varying mixtures of both high and low temperature medium.

In practical operation, due to the speed at which a chamber of this type may be regenerated, regeneration plus pre- and after-purging, preheating, and after cooling, frequently takes less time than reaction, so only two cases need be used. In this case, while the general aspects of the above operations are maintained, it becomes convenient to introduce storage capacity at 54 in the high temperature circuit. Then, if chamber 29 be on reaction, and 31 not be in use, 30 is heated for regeneration by circulating high temperature medium from 54, regenerated, during which time heat storage in 54 is replenished, taken off regeneration and isolated from 54, and cooled by low temperature medium before return to reaction.

The salient feature of this operation is the rapidity with which temperature changes of the catalyst mass from a comparatively low temperature of reaction to a substantially higher temperature for regeneration, and the converse, may be made. This is due to the fact that the system not only has available a supply of both high level and low level heat storage (exchange) medium, but is able to effectively circulate the desired medium in controlled amounts in effective heat transfer relationship with the catalyst mass, the temperature of which it is desired to change.

We claim:
1. Apparatus for conducting a unitary operation of reaction in the presence of a contact mass followed by regeneration in situ of the contact mass at a temperature different from that of the catalytic reaction comprising two or more chambers whereby there may be continuously afforded at least one chamber containing regenerated contact mass, each chamber containing contact mass all portions of which are in intimate heat transfer relationship with heat conductive material, means for passing a heat exchange medium in contact with said heat conductive material but in indirect heat transfer relationship with the contact mass in each chamber, means to pass reaction material for said catalytic reaction through each chamber, means to alternatively pass regeneration medium through each chamber, two heat exchange medium circuits, in one circuit heating means to maintain heat exchange medium therein at a temperature near that of the catalytic reaction, in the second circuit cool- ing means to maintain the heat exchange medium therein at a temperature near that of regeneration, means to selectively pass heat exchange medium from each circuit to any chamber.

2. Apparatus for conducting a unitary operation of reaction in the presence of a contact mass followed by regeneration in situ of the contact mass at a temperature different from that of the catalytic reaction comprising two or more chambers whereby there may be continuously afforded at least one chamber containing regenerated contact mass, each chamber containing contact mass all portions of which are in intimate heat transfer relationship with heat conductive material, means for passing a heat exchange medium in contact with said heat conductive material but in indirect heat transfer relationship with the contact mass in each chamber, means to pass reaction material for said catalytic reaction through each chamber, means to alternatively pass regeneration medium through each chamber, two heat exchange medium circuits, in one circuit means to maintain heat exchange medium therein at a temperature near that of the catalytic reaction in the second circuit means to maintain the heat exchange medium therein at a temperature near that of regeneration, means to selectively pass heat exchange medium from either circuit to any chamber, and means operative to interconnect said two circuits.

3. In a cyclic operation comprising a hydrocarbon conversion reaction in the presence of a catalyst followed by a regeneration reaction in situ of said catalyst at a different temperature from that of said conversion reaction wherein the temperatures of both reactions are controlled by means of fluid heat exchange medium, the improvement which comprises effecting a rapid temperature change operation of the catalyst when it is desired to change from one of said cyclic reactions to the other by having a supply of fluid heat exchange medium ready at the time it is desired to make the change which is at a temperature not substantially different from the temperature of the next reaction to be carried out, withdrawing the heat exchange medium in exchange with the catalyst, and passing said ready supply of heat exchange medium into indirect exchange with the catalyst at the start of the temperature change operation and throughout said operation, thereby rapidly changing the temperature of the catalyst from that of the reaction last carried out to that of the next reaction to be carried out.

4. In a cyclic operation comprising a conversion reaction in the presence of a catalyst followed by a regeneration reaction in situ of said catalyst at a different temperature from that of said conversion reaction, the improvement which comprises effecting a rapid temperature change operation of the catalyst when it is desired to change from one of said cyclic reactions to the other by having a supply of fluid heat exchange medium ready at the time it is desired to make the change which is at a temperature not substantially different from the temperature of the next reaction to be carried out, and passing said supply of heat exchange medium into indirect exchange with the catalyst at the start of the temperature change operation and throughout said operation, thereby rapidly changing its temperature from that of the reaction last carried out to that of the reaction to be carried out.

5. In a method of conducting cyclic operations comprising a conversion reaction in the presence of a catalyst followed by a regeneration reaction in situ of said catalyst at a different temperature from that of said conversion reaction with the temperatures of both reactions being controlled by means of fluid heat exchange medium maintained at approximately the temperature of the reaction it controls and wherein one catalyst body is being subjected to conversion reaction and simultaneously another catalyst body is being subjected to regeneration reaction, the improvement which comprises effecting a rapid temperature change operation of the catalyst bodies when it is desired to change from one of said cyclic reactions to the other by withdrawing the heat exchange medium in exchange with the catalyst bodies, passing the heat exchange medium used to control the regeneration reaction, which is maintained at approximately such reaction temperature by extraction of heat therefrom, into indirect exchange with the catalyst body to be changed to regeneration reaction at the start of and throughout its temperature change operation, passing the heat exchange medium used to control the conversion reaction, which is maintained at approximately such reaction temperature by addition of heat thereto, into indirect exchange with the catalyst body to be changed to conversion reaction at the start of and throughout its temperature change operation thereby rapidly changing the temperature of the catalyst bodies from that of the reaction last carried out to that of the next reaction to be carried out.

6. In a method of conducting cyclic operations comprising a conversion reaction in the presence of a catalyst followed by a regeneration reaction in situ of said catalyst at a substantially different temperature than that of said conversion reaction with the temperatures of both reactions being controlled by means of fluid heat exchange medium and wherein one catalyst body is being subjected to conversion reaction and simultaneously another catalyst body is being subjected to regeneration reaction, the improvement which comprises effecting a rapid temperature change operation of the catalyst bodies when it is desired to change from one of said cyclic reactions to the other by withdrawing the heat exchange medium in exchange with the catalyst bodies, passing the heat exchange medium used to control the regeneration reaction into indirect exchange with the catalyst body to be regenerated at the start of and throughout its temperature change operation, passing the heat exchange medium used to control the conversion reaction into indirect exchange with the catalyst body to be changed to conversion reaction at the start of and throughout its temperature change operation, and preparing a third catalyst body for one of the above cyclic reactions by passing heat exchange medium used to control the reaction for which said third catalyst body is being prepared into indirect exchange with said third catalyst body.

7. In a cyclic operation comprising a catalytic polymerization of hydrocarbon gases to gasoline at temperatures not substantially in excess of 350° F. and a regeneration in situ of the polymerization catalyst at temperatures not substantially below 600° F. wherein the temperatures of both reactions are controlled by means of fluid heat exchange medium maintained at approximately the temperature of the reaction being controlled, the improvement which comprises effecting a rapid temperature change operation of the catalyst when it is desired to change from one of said cyclic reactions to the other by having a supply of fluid heat exchange medium ready at the time it is desired to make the change which is at a temperature not substantially different from the temperature of the next reaction to be carried out, withdrawing the heat exchange medium in exchange with the catalyst, and passing said ready supply of heat exchange medium into indirect exchange with the catalyst at the start of the temperature change operation and throughout said operation, thereby rapidly changing the temperature of the catalyst from that of the reaction last carried out to that of the next reaction to be carried out.

8. In a cyclic operation comprising a catalytic polymerization of hydrocarbon gases to gasoline at temperatures not substantially in excess of 350° F. and a regeneration in situ of the polymerization catalyst at temperatures not substantially below 600° F., wherein the temperatures of both reactions are controlled by means of fluid heat exchange medium maintained at approximately the temperature of the reaction being controlled, and wherein one catalyst body is being subjected to polymerization reaction and simultaneously another catalyst body is being subjected to regeneration reaction, the improvement which comprises effecting a rapid temperature change operation of the catalyst bodies when it is desired to change from one of said cyclic reactions to the other by withdrawing the heat exchange medium in exchange with the catalyst bodies, passing the heat exchange medium used to control the regeneration reaction, which is maintained at approximately such reaction temperature by extraction of heat therefrom, into indirect heat exchange with the catalyst body to be changed to regeneration reaction at the start of and throughout its temperature change operation, passing the heat exchange medium used to control the polymerization reaction, which is maintained at approximately such reaction temperature by addition of heat thereto, into indirect heat exchange with the catalyst body to be changed to polymerization reaction at the start of and throughout its temperature change operation, thereby rapidly changing the temperature of the catalyst bodies from that of the reaction last carried out to that of the next reaction to be carried out.

9. A method of conducting cyclic reactions comprising a polymerization of hydrocarbon gases to gasoline at temperatures not substantially in excess of 350° F. and a regeneration in situ of the polymerization catalyst at temperatures not substantially below 600° F., wherein the temperatures of both reactions are controlled by means of fluid heat exchange medium maintained at approximately the temperature of the reaction being controlled, and wherein there is one catalyst body being subjected to polymerization reaction and simultaneously a second catalyst body is being subjected to regeneration reaction and simultaneously a third catalyst body is being adjusted in temperature for one of the two cyclic reactions, the improvement which comprises controlling the temperature of the catalyst bodies being subjected to reaction and changing the temperature of a catalyst body being prepared for reaction by circulating the fluid heat exchange medium in indirect heat exchange with a catalyst body subjected to reaction at substantially the temperature of that particular reaction, then circulating the heat exchange medium in indirect heat exchange with the catalyst body being prepared for one of said cyclic reactions, then adjusting the temperature of the heat exchange medium to the temperature of the other cyclic reaction, then passing the so adjusted heat exchange medium in indirect heat exchange with a catalyst body subjected to this latter cyclic reaction, then adjusting the temperature of the heat exchange medium to that of said first mentioned cyclic reaction, and then recycling the heat exchange medium back to a catalyst body undergoing said first cyclic reaction in such manner as to form a continuous circuit of heat exchange medium, said catalyst body which is being prepared for one of said cyclic reactions when undergoing preparation for regeneration being placed in the line of heat exchange medium flow immediately after regeneration and when undergoing preparation for polymerization being placed in line of flow immediately after polymerization.

THOMAS P. SIMPSON.
JOHN W. PAYNE.
JOHN A. CROWLEY, Jr.